United States Patent
Aoyagi

(10) Patent No.: US 9,228,528 B2
(45) Date of Patent: Jan. 5, 2016

(54) FEEDBACK CONTROL SYSTEM

(75) Inventor: Shinsuke Aoyagi, Zama (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/359,774

(22) PCT Filed: Nov. 22, 2011

(86) PCT No.: PCT/JP2011/076930
§ 371 (c)(1),
(2), (4) Date: May 21, 2014

(87) PCT Pub. No.: WO2013/076816
PCT Pub. Date: May 30, 2013

(65) Prior Publication Data
US 2014/0303877 A1    Oct. 9, 2014

(51) Int. Cl.
| | |
|---|---|
| F02D 41/24 | (2006.01) |
| F02D 41/34 | (2006.01) |
| F02D 41/00 | (2006.01) |
| G05B 11/42 | (2006.01) |

(52) U.S. Cl.
CPC ............ *F02D 41/34* (2013.01); *F02D 41/0002* (2013.01); *F02D 41/2454* (2013.01); *G05B 11/42* (2013.01)

(58) Field of Classification Search
CPC .............. F02D 41/002; F02D 41/2454; F02D 41/2458; F02D 41/2461
USPC ........................... 701/103, 104; 123/399, 674
See application file for complete search history.

(56) References Cited

U.S. PATENT DOCUMENTS

| | | | | |
|---|---|---|---|---|
| 4,741,312 | A | * | 5/1988 | Ohishi ........................... 123/674 |
| 4,771,753 | A | * | 9/1988 | Ohishi ........................... 123/674 |
| 4,844,041 | A | * | 7/1989 | Ave et al. ....................... 123/674 |
| 2010/0174471 | A1 | | 7/2010 | Nakayama |
| 2012/0125301 | A1 | | 5/2012 | Ide et al. |

FOREIGN PATENT DOCUMENTS

| | | |
|---|---|---|
| JP | 05-181502 A | 7/1993 |
| JP | 06-168004 A | 6/1994 |
| JP | 2001-265408 A | 9/2001 |
| JP | 2003-122401 A | 4/2003 |

(Continued)

*Primary Examiner* — Erick Solis
(74) *Attorney, Agent, or Firm* — Kenyon & Kenyon LLP

(57) ABSTRACT

An object of the invention is to provide a feedback control system that calculates a P term and an I term on the basis of a deviation between a target value and a measured value of a control amount, and calculates a correction amount to be applied to an operation amount of a control subject on the basis of a PI term, which is a sum of the P term and the I term, wherein divergence of the I term in a condition where the PI term is restricted by a guard is prevented while improving a convergence property of the I term following removal of the restriction applied to the PI term by the guard. For this purpose, the feedback control system calculates, as a corrected previous value of the I term, a value obtained by subtracting a difference between a value of the PI term prior to restriction by the guard and a value of the PI term following restriction by the guard, from a value of the I term, and then updates the value of the I term by adding an update amount calculated from the deviation between the target value and the measured value of the control amount to the corrected previous value of the I term.

9 Claims, 4 Drawing Sheets

(56) References Cited

FOREIGN PATENT DOCUMENTS

| | | |
|---|---|---|
| JP | 2004-060613 A | 2/2004 |
| JP | 2004-086858 A | 3/2004 |
| JP | 2007-087367 A | 4/2007 |
| JP | 2008-291752 A | 12/2008 |
| JP | 2010-249000 A | 11/2010 |
| WO | 2011/099174 A1 | 8/2011 |

* cited by examiner

CONTROL RESULT (A-3)

CONTROL RESULT (B-3)

FEEDBACK CONTROL SYSTEM

CROSS-REFERENCE TO RELATED APPLICATIONS

This is a national phase application based on the PCT International Patent Application No. PCT/JP2011/076930 filed Nov. 22, 2011, the entire contents of which are incorporated herein by reference.

TECHNICAL FIELD

The invention relates to a feedback control system, and more particularly to a feedback control system suitable for use in controlling an air-fuel ratio of an internal combustion engine for an automobile.

BACKGROUND ART

In an internal combustion engine for an automobile, various types of feedback control are performed. In the case of a diesel engine, for example, feedback control is used during boost pressure control, exhaust gas recirculation (EGR) control, and air-fuel ratio control.

PI control (proportional integral control) is a typical feedback control method used in an internal combustion engine. To control the air-fuel ratio of a diesel engine, for example, a feedback control system having a control logic such as that shown in a block diagram in FIG. 6 is used. In this feedback control system, a target air-fuel ratio is determined in relation to the air-fuel ratio, which serves as a control amount. A measured air-fuel ratio is then obtained from an air-fuel ratio sensor, whereupon an air-fuel ratio deviation, which is a deviation between the target air-fuel ratio and the measured air-fuel ratio, is calculated. A P term (a proportional term) is then calculated by multiplying the air-fuel ratio deviation by a predetermined proportional gain $G_p$. Further, an I term (an integral term) is updated by adding a value obtained by multiplying the air-fuel ratio deviation by a predetermined integral gain $G_p$ to a previous value of the I term. The P term and the I term are then added together, whereupon correction amounts to be applied to a fuel injection amount and an air amount serving as operation amounts are calculated on the basis of a PI term (a proportional integral term) constituted by the sum of the P term and the I term. Note, however, that in the control logic of FIG. 6, a magnitude of the PI term is restricted by a guard. A value of the guard is a variable value that is modified in accordance with an operating condition of the engine.

Restricting the magnitude of the PI term using a guard is a conventional technique disclosed in Japanese Patent Application Publication No. 2008-291752 (JP 2008-291752), for example. The correction amount relating to the operation amount of the internal combustion engine is calculated on the basis of the PI term, and therefore, when the guard is not provided in relation to the PI term, various problems occur during an operation of the internal combustion engine.

Taking control of an air-fuel ratio of a diesel engine as an example, when the operating condition of the engine varies rapidly, the air-fuel ratio deviation may increase rapidly, causing the value of the PI term to increase or decrease rapidly. When the rapidly increased or rapidly reduced value of the PI term is used as is to calculate the correction amount applied to the fuel injection amount or the air amount, an excessive correction amount may be applied to the engine, and as a result, the operating condition of the engine may become unstable.

Further, when an abnormality occurs in the air-fuel ratio sensor, for example when an output value of the air-fuel ratio sensor becomes stuck at a certain value, the air-fuel ratio deviation may never be eliminated, and as a result, the PI term may continue to increase or decrease. When the continuously increasing or decreasing value of the PI term is used as is to calculate the correction amount applied to the fuel injection amount or the air amount, an actual air-fuel ratio may gradually diverge from the target air-fuel ratio.

The reason for providing the guard in relation to the PI term is to prevent such problems from occurring. Taking the control logic shown in FIG. 6 as an example, when the value of the PI term exceeds the value of the guard, the value of the guard is applied to the engine instead of the value of the PI term. In so doing, the problems described above are avoided.

However, the PI term corresponds to the correction amount required to eliminate the air-fuel ratio deviation, and therefore, when a restriction is applied to the PI term, the correction amount becomes insufficient such that the air-fuel ratio deviation remains without being eliminated. When feedback control is performed normally with no restriction on the PI term, the PI term gradually converges on a value of a correction amount (referred to as an engine requirement value hereafter) actually required by the engine as the air-fuel ratio deviation is eliminated. When a steady-state error included in the P term is shifted to the I term, the P term converges on zero and the I term converges on the engine requirement value. When the air-fuel ratio deviation remains, however, the air-fuel ratio deviation is repeatedly and continuously integrated into the I term. As a result, when the air-fuel ratio deviation takes a positive value, the I term diverges to positive infinity, and when the air-fuel ratio deviation takes a negative value, the I term diverges to negative infinity.

As described above, when the magnitude of the PI term is restricted by a guard, divergence of the I term occurs as a separate problem. Once the I term has diverged, an excessive correction amount is calculated when the operating condition varies such that the guard on the PI term is removed. Further, when correction of the operating amount through feedback control is resumed following removal of the guard on the PI term, the I term starts to converge toward the engine requirement value again, but after the I team has diverged, it takes a long time for the I term to converge on the engine requirement value.

Divergence of the I term occurring when the PI term is restricted by a guard can be prevented using following methods, for example. In a first method, updating of the I term is stopped while the value of the PI term exceeds the value of the guard. While updating is stopped, the value of the I term is held at a value immediately before updating was stopped. According to this method, divergence of the I term can be prevented reliably. However, convergence of the I term on the engine requirement value is delayed by an amount corresponding to the time during which updating of the I term is stopped.

In a second method for preventing divergence of the I term, as disclosed in Japanese Patent Application Publication No. 2010-249000 (JP 2010-249000 A) and Japanese Patent Application Publication No. 2004-060613 (JP 2004-060613 A), for example, a guard that restricts the magnitude of the I term is provided. According to this method, divergence of the I term is stopped by the guard, and therefore a situation in which the I term diverges to infinity or negative infinity is prevented. In this case, when correction of the operation amount through feedback control is resumed after removing the guard on the PI term, the I term varies toward the engine requirement value using the value of the guard as a departure point. However, the value of the I term guard is set at a considerably larger value than a normally envisaged engine requirement value, and it therefore takes a long time for the I term to converge on the engine requirement value.

The two methods described above are effective methods for preventing divergence of the I term in a condition where the PI term is restricted by a guard. As described above, however, these methods are problematic in terms of a convergence property of the I term following removal of the restriction applied to the PI term by the guard.

Patent Document 1: Japanese Patent Application Publication No. 2008-291752

Patent Document 2: Japanese Patent Application Publication No. 2010-249000

Patent Document 3: Japanese Patent Application Publication No. 2004-060613

SUMMARY OF THE INVENTION

The invention relates to a feedback control system that calculates a correction amount to be applied to an operation amount of a control subject on the basis of a PI term, which is a sum of a P term and an I term based on a deviation between a target value and a measured value of a control amount. An object of the invention is to prevent divergence of the I term in a condition where the PI term is restricted by a guard while improving a convergence property of the I term following removal of the restriction applied to the PI term by the guard. To achieve this object, a feedback control system according to an aspect of the invention calculates, as a corrected previous value of the I term, a value obtained by subtracting a difference between a value of the PI term prior to restriction by the guard and a value of the PI term following restriction by the guard, from a value of the I term. The feedback control system then calculates a value obtained by multiplying a predetermined gain by the deviation between the target value and the measured value of the control amount, and updates the value of the I term by adding this value to the corrected previous value of the I term. Thus, updating of the I term is continued even after the value of the PI term impinges on the guard, and as a result, the I term converges on a value in the vicinity of the variable PI term guard. In other words, an improvement is achieved in the convergence property of the I term following removal of the restriction applied to the PI term by the guard.

According to a preferred aspect of the invention, the feedback control system includes a function for shifting a steady state error component included in the I term to a learned term. More specifically, a sum of the PI term following restriction by the guard and the learned term is calculated as a total correction term, and a value of the learned term is updated on the basis of the value of the PI term following restriction by the guard. In this feedback control system, the total correction term is used to calculate the correction amount applied to the operation amount. To prevent excessive correction of the operation amount, however, a magnitude of the total correction term is restricted using a total correction term guard. The corrected previous value of the I term is then further corrected by subtracting a difference between a value of the total correction term prior to restriction by the guard and a value of the total correction term following restriction by the guard. In so doing, an operation for shifting the steady state error component included in the I term to the learned term can be realized even in a condition where the total correction term is restricted by the guard. Preferably in this case, when the value of the total correction term exceeds the value of the guard and a value of a sum of the P term and the learned term likewise exceeds the value of the guard, the corrected previous value of the I term is fixed at zero.

Note that the total correction term guard is preferably set at a smaller value than the PI guard. Further, guards may also be provided for the P term and the I term. Note, however, that a value of the P term guard is preferably set at a value that is identical to or smaller than the value of the PI term guard. Meanwhile, in a case where the feedback control system does not include a learning function, a value of the I term guard is preferably set at a larger value than the value of the variable PI term guard. When the feedback control system includes the learning function, however, the value of the I term guard is preferably set at a larger value than the total correction term guard and a smaller value than the PI term guard.

MODES FOR CARRYING OUT THE INVENTION

First Embodiment

A first embodiment of the invention will now be described with reference to the drawings.

In this embodiment, a feedback control system according to the invention is applied to control of an air-fuel ratio of a diesel engine. The air-fuel ratio is controlled by an electronic control unit (ECU) that controls the diesel engine. The feedback control system according to this embodiment is realized as a part of the functions of the ECU.

Figure 1:
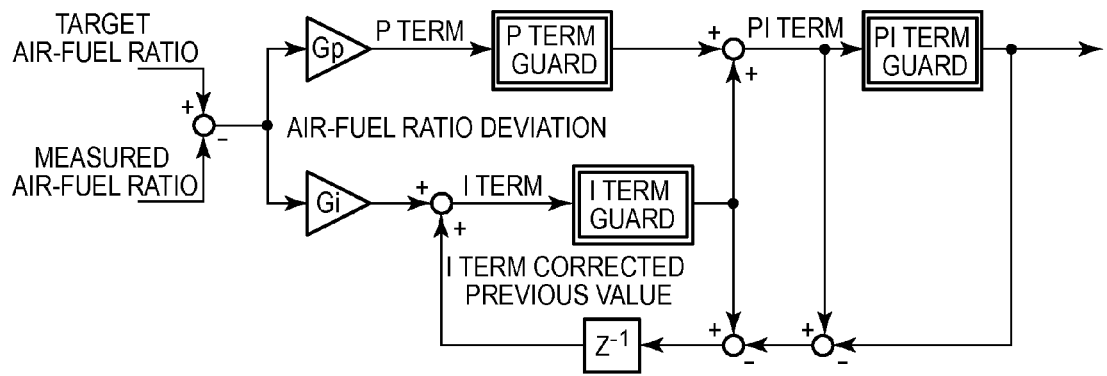
FIG. 1 is a block diagram showing a control logic of a feedback control system according to a first embodiment of the invention.

FIG. 1 is a block diagram showing a control logic of the feedback control system according to this embodiment. In this feedback control system, a deviation (an air-fuel ratio deviation) between a target air-fuel ratio and a measured air-fuel ratio measured by an air-fuel ratio sensor is calculated. A P term is then calculated by multiplying a predetermined proportional gain $G_p$ by the air-fuel ratio deviation. Further, an update amount of an I term is calculated by multiplying a predetermined integral gain $G_p$ by the air-fuel ratio deviation. The update amount is added to a corrected previous value of the I term, to be described below. As a result, a value of the I term is updated.

In this feedback control system, a guard (referred to hereafter as a P term guard) is provided to restrict a magnitude of the P term. Further, a guard (referred to hereafter as an I term guard) is provided to restrict a magnitude of the I term. The P term (referred to hereafter as a post-guard P term) restricted by the P term guard and the I term (referred to hereafter as a post-guard I term) restricted by the I term guard are added together, and a PI term is calculated as a sum thereof. Note that in the following description, the P term prior to restriction by the P term guard may be referred to as a pre-guard P term in order to differentiate the pre-guard P term from the post-guard P term. Further, the I term prior to restriction by the I term guard may be referred to as a pre-guard I term in order to differentiate the pre-guard I term from the post-guard I term.

In this feedback control system, a guard (referred to hereafter as a PI term guard) is provided to restrict a magnitude of the PI term. The PI term guard is a variable guard, a guard value of which is modified in accordance with an operating condition of the engine. The P term guard is also a variable guard, a guard value of which is set at an identical value to the guard value of the PI term guard. Note, however, that the guard value of the P term guard may be set at a smaller value than the value of the PI term guard. The I term guard, on the other hand, is a fixed guard, a guard value of which is fixed at a larger value than the guard value of the PI term guard. By setting the guards in this manner, when the PI term is cut by the PI term guard, a cut component may be considered as the I term. Note that a positive guard value and a negative guard value are set respectively for all of the PI term guard, the P term guard, and the I term guard. The reason for this is that all of the PI term, the P term, and the I term may take a positive value or a negative value.

In this feedback control system, correction amounts of a fuel injection amount and an air amount are calculated on the basis of the PI term (referred to hereafter as a post-guard PI term) restricted by the PI term guard. There are no particular limitations on a specific method of calculating the correction amounts from the post-guard PI term. Note that in the following description, the PI term prior to restriction by the PI term guard may be referred to as a pre-guard PI term in order to differentiate the pre-guard PI term from the post-guard PI term.

Next, a method of updating the I term, which is a main component of this feedback control system, will be described.

In a normal feedback control system, the I term is updated by adding an update amount to a previous value of the I term. In this feedback control system, however, a corrected previous value is used to update the I term instead of the previous value of the I term. The corrected previous value used in this embodiment is defined as a previous value of a value obtained by subtracting a difference between the value of the pre-guard PI term and the value of the post-guard PI term from the value of the post-guard I term. A value obtained by adding the update amount to the corrected previous value serves as an updated value of the I term.

According to this definition, when the value of the pre-guard PI term is within a range of the PI term guard, or in other words when the pre-guard PI term is not cut by the PI term guard, the previous value of the post-guard I term is used as is as the corrected previous value. When, however, the value of the pre-guard PI term exceeds the value of the PI term guard, a previous value of a value obtained by subtracting an excess value from the post-guard I term is used as the corrected previous value of the I term. According to the control logic of this feedback control system, as described above, it may be considered that only the I term, from among the components constituting the PI term, is cut by the PI term guard. Therefore, when the value of the pre-guard PI term exceeds the PI term guard, the excess may be considered as a part of the post-guard I term cut by the PI term guard. In other words, in this feedback control system, the part of the post-guard I term that is cut by the PI term guard is subtracted from the I term during an update.

According to the I term update method employed in this feedback control system, divergence of the I term in a condition where the PI term has impinged on the PI term guard can be prevented. Effects thereof will be described below using FIGS. 2 and 3.

Figure 2:
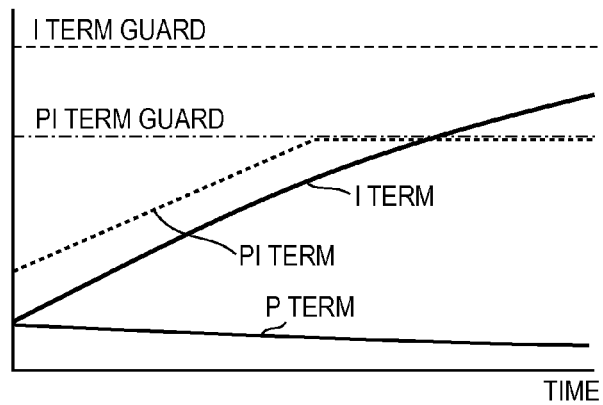
FIG. 2 is a view showing a control result obtained by the feedback control system shown in FIG. 1 in comparison with a comparative example.
Figure 2:
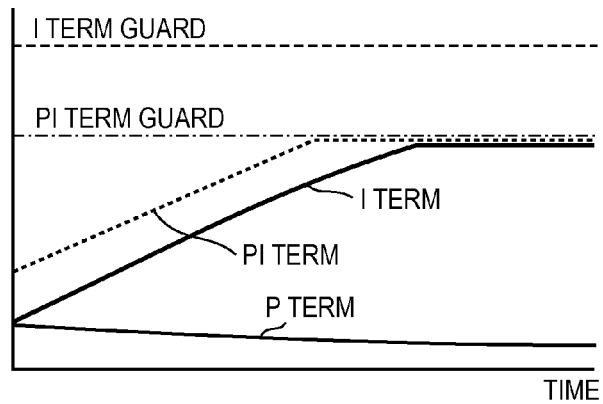

FIG. 2 is a view showing a control result obtained by this feedback control system in comparison with a comparative example. A control result (A-1) is the comparative example, and indicates a control result obtained in a case where the previous value of the post-guard I term is used as is to update the I term. A control result (B-1) is the control result obtained by this feedback control system. In both control results, the respective post-guard values of the PI term, the P term, and the I term are shown. Note that these control results are control results obtained in a case where the PI term is restricted by the PI term guard while feedback control to eliminate an air-fuel ratio deviation is underway. Further, in these control results, the proportional gain $G_p$ and the integral gain $G_p$ are set at identical values.

In the control result (A-1), the I term continues to increase even after the PI term is restricted by the PI term guard. The reason for this is that the air-fuel ratio deviation remains, and therefore the update amount calculated from the air-fuel ratio deviation is continuously integrated into the I term. As a result, the I term diverges until it impinges on the I term guard, which is set at a larger value than the PI term guard.

In the control result (B-1), on the other hand, the I term converges on a fixed value without diverging after the PI term is restricted by the PI term guard. The reason for this is that the part of the I term that is cut by the PI term guard is subtracted when updating the I term, and therefore a further increase in the I term is suppressed. Note that here, the I term converges on an identical value to the post-guard PI term, and the reason for this is that the proportional gain $G_p$ and the integral gain $G_p$ are set at identical values. When the proportional gain $G_p$ is larger than the integral gain $G_p$, a convergence value of the I term is smaller than the value of the post-guard PI term. Conversely, when the proportional gain $G_p$ is smaller than the integral gain $G_p$, the convergence value of the I term is larger than the value of the post-guard PI term. In all cases, according to this feedback control system, divergence of the I term in a condition where the PI team has impinged on the PI term guard can be prevented.

Figure 3:
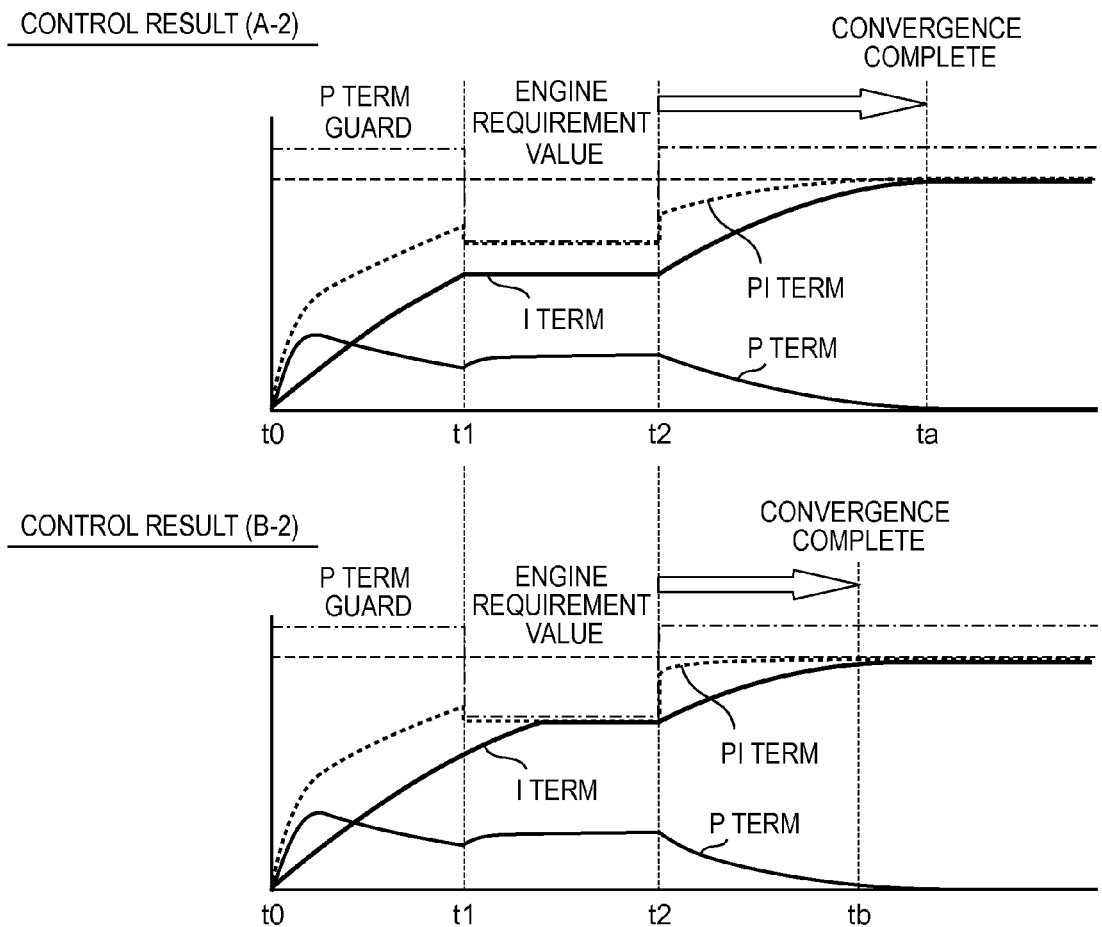
FIG. 3 is a view showing a control result obtained by the feedback control system shown in FIG. 1 in comparison with a comparative example.

FIG. 3 is a view showing the control result obtained by this feedback control system in comparison with another comparative example. A control result (A-2) is the comparative example, and indicates a control result obtained in a case where updating of the I term is stopped while the PI term impinges on the PI term guard. A control result (B-2) is the control result obtained by this feedback control system. In both control results, the respective post-guard values of the PI term, the P term, and the I term are shown. Note that these control results are control results obtained in a case where feedback control is started at a time t0, at which the I term is in an initial condition, and the PI term guard is temporarily modified to a lower value than the engine requirement value from a time t1 to a time t2 thereafter. Further, similarly to the control results shown in FIG. 2, in these control results, the proportional gain $G_p$ and the integral gain $G_p$ are set at identical values.

In the control result (A-2), updating of the I term is stopped at the time t1 when the PI term impinges on the PI term guard, whereby the I term is held at a value thereof immediately before updating was stopped. When the PI term guard is returned to its original value at the time t2 thereafter such that the guard is removed from the PI term, first, the PI term starts to converge toward the engine requirement value. Once the PI term has converged on the engine requirement value, the P term decreases so as to converge on zero while the I term increases by an amount corresponding to the reduction in the P term so as to converge on the engine requirement value. At this time, the I term converges toward the engine requirement value using the value thereof immediately before updating was stopped as a departure point. As a result, the completion of convergence is delayed.

In the control result (B-2), on the other hand, updating of the I term is continued while the PI term impinges on the PI term guard such that the value of the I term increases to the value of the PI term guard. Hence, after the guard is removed from the PI term at the time t2, the I term starts to converge toward the engine requirement value using the value of the PI term guard as the departure point. As a result, a time tb at which convergence of the I term is completed according to this feedback control system is earlier than a time ta at which convergence of the I term is completed according to the comparative example. Note that in this embodiment, the proportional gain $G_p$ and the integral gain $G_p$ are set at identical values, and therefore the I term converges on the value of the PI term guard. However, when the proportional gain $G_p$ is larger than the integral gain $G_p$, the I term converges on a smaller value than the value of the PI term guard, and when the proportional gain $G_p$ is smaller than the integral gain $G_p$, the I term converges on a larger value than the value of the PI term guard. In all cases, however, the I term converges toward the engine requirement value using a value in the vicinity of the PI term guard as the departure point, and therefore convergence of the I term is completed earlier than in the comparative example. In other words, according to this feedback control system, it is possible not only to prevent divergence of the I term, but also to improve the convergence property of the I term following removal of the restriction applied to the PI term by the guard.

Second Embodiment

Next, a second embodiment of the invention will be described with reference to the drawings.

In this embodiment, similarly to the first embodiment, the feedback control system according to the invention is applied to control of an air-fuel ratio of a diesel engine. Similarly to the first embodiment, the feedback control system according to this embodiment is realized as a part of the functions of the ECU.

Figure 4:
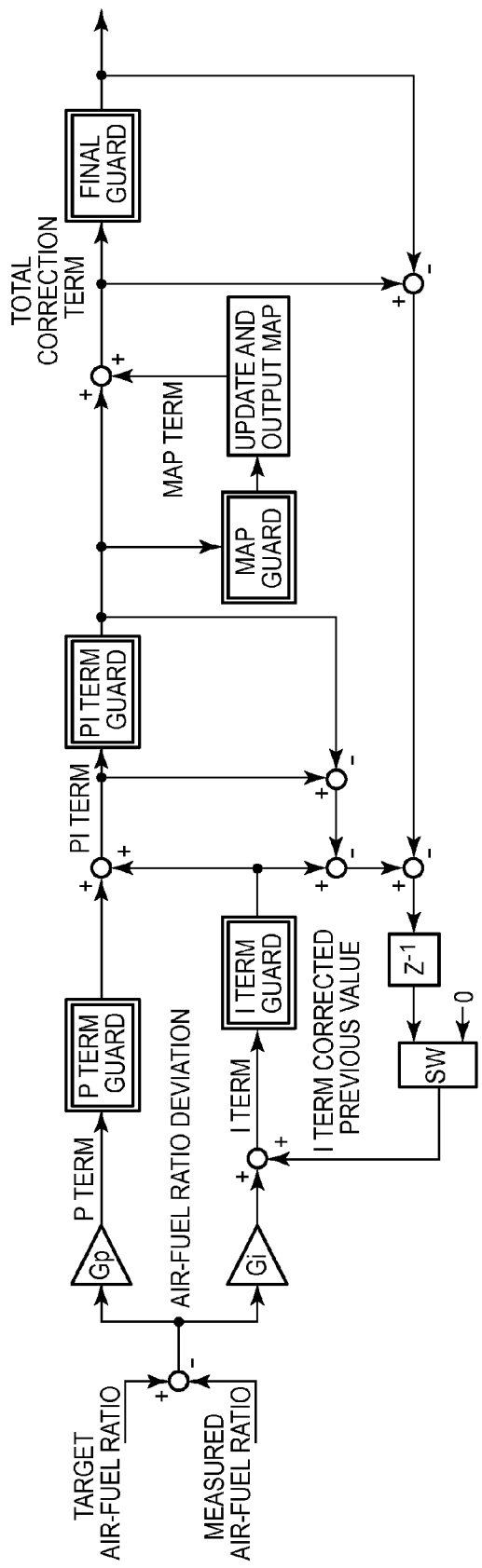
FIG. 4 is a block diagram showing a control logic of a feedback control system according to a second embodiment of the invention.

FIG. 4 is a block diagram showing a control logic of the feedback control system according to this embodiment. The feedback control system according to this embodiment differs from the feedback control system according to the first embodiment in including a learning function that stores a steady state error included in the air-fuel ratio deviation as a learned value. The learned value is learned from the post-guard PI term and stored on a map. Note, however, that a magnitude of the post-guard PI term used during learning is restricted by a map guard. Learning of the learned value on the basis of the post-guard PI term is performed in each operating condition of the engine such that the learned value stored on the map is updated continuously. There are no particular limitations on a specific learning method.

In this feedback control system, the learned value read from the map is used as a map term (a learned term). The map term is added to the post-guard PI term, and a sum thereof serves as a total correction term. A magnitude of the total correction term is restricted by a guard (referred to hereafter as a final guard). A guard value of the final guard is set at a smaller value than the guard values of all of the other guards to ensure that misfiring and smoke generation caused by excessive correction are reliably avoided. The map guard has an identical guard value to the I term guard. The guard value of the map guard and the I term guard is set at a value corresponding to a steady state error included in the air-fuel ratio deviation and caused by individual differences in an injector and an air flow meter. The guard values of the PI term guard and the P term guard are set to be larger than the guard value of the map guard and the I term guard. Similarly to the first embodiment, a positive guard value and a negative guard value are set respectively for all of the guards, including the final guard.

In this feedback control system, the correction amounts for the fuel injection amount and the air amount are calculated on the basis of a total correction term (referred to hereafter as a post-guard total correction term) restricted by the final guard. There are no particular limitations on a specific method of calculating the correction amounts from the post-guard total correction term. Note that in the following description, the total correction term prior to restriction by the final guard may be referred to as a pre-guard total correction term in order to differentiate the pre-guard total correction term from the post-guard total correction term.

Next, a method of updating the I term, which is a main component of this feedback control system, will be described.

In this feedback control system, the corrected previous value is used to update the I term. A value obtained by adding the update amount to the corrected previous value serves as the updated value of the I term. Note, however, that the corrected previous value used in the feedback control system according to this embodiment has a different definition to the corrected previous value used in the first embodiment. The corrected previous value used in this embodiment is defined as a previous value of a value obtained by subtracting the difference between the value of the pre-guard PI term and the value of the post-guard PI term from the value of the post-guard I term and then subtracting therefrom a difference between the value of the pre-guard total correction term and the post-guard total correction term. When a certain condition is satisfied, however, the corrected previous value is switched to zero by a switch (SW) and fixed. The condition is satisfied when the value of the pre-guard total correction term exceeds the value of the final guard, and a value of a sum of the post-guard P term and the map term likewise exceeds the value of the final guard.

According to this feedback control system, the part of the post-guard I term that is cut by the PI term guard and a part of the total correction term that is cut by the final guard are subtracted while updating the I term until the aforesaid condition is satisfied. The total correction term is the sum of the post-guard PI term and the map term, and therefore, as learning progresses such that the map term grows, the amount cut by the final guard increases, leading to a corresponding reduction in the corrected previous value used to update the I term. In other words, the value of the I term converges toward zero as the map term grows. Hence, an operation to shift a steady state error component included in the I term to the map term can be realized even in a condition where the total correction term is restricted by the final guard. When shifting of the steady state error component from the I term to the map term is complete, the value of the I term converges on zero. At this time, the total correction term is equal to the sum of the post-guard P term and the map term, and therefore the aforesaid condition is satisfied such that the corrected previous value of the I term is switched to zero and fixed. As a result, a situation in which the I term exceeds zero so as to be integrated to a negative side is avoided.

Figure 5:
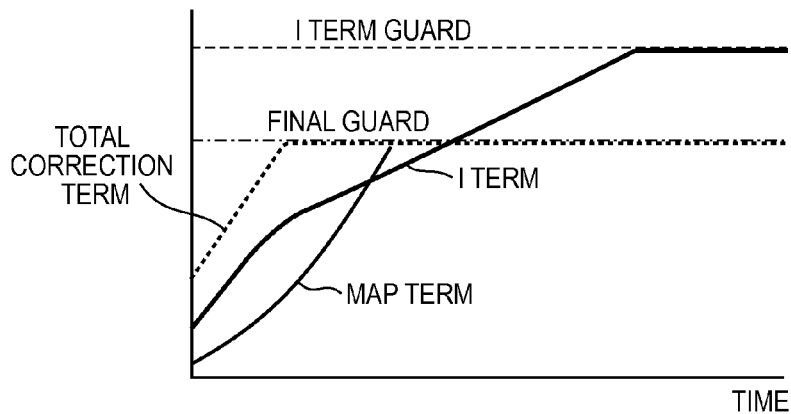
FIG. 5 is a view showing a control result obtained by the feedback control system shown in FIG. 4 in comparison with a comparative example.
Figure 5:
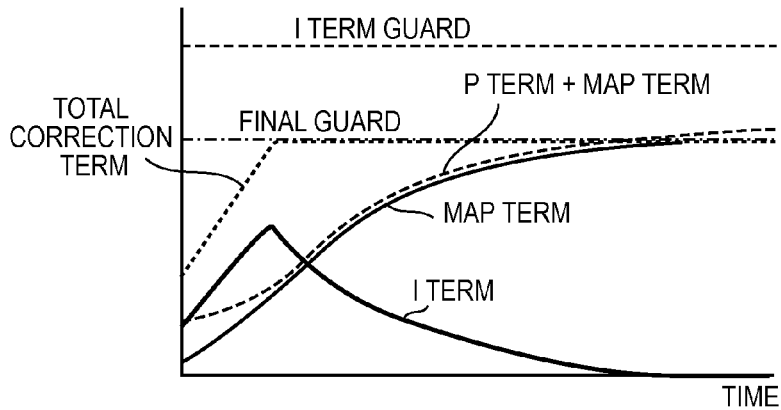
Figure 6:
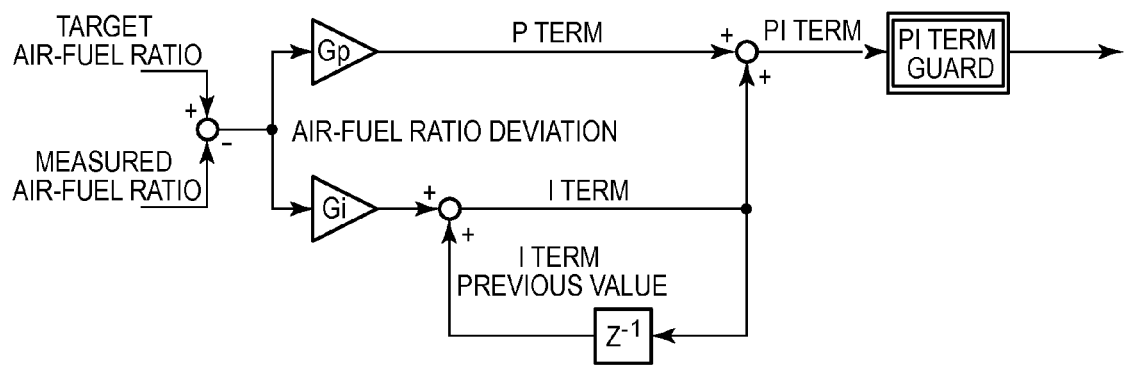
FIG. 6 is a block diagram showing a typical control logic of a feedback control system used to control an air-fuel ratio.

According to the operation of the feedback control system described above, a control result such as that shown in FIG. 5 can be obtained. FIG. 5 is a view showing a control result obtained by this feedback control system in comparison with a comparative example. A control result (A-3) is the comparative example, and indicates a control result obtained in a case where the previous value of the post-guard I term is used as is to update the I term. A control result (B-3) is the control result obtained by this feedback control system. In both control results, the respective post-guard values of the total correction term, the PI term, and the P term are shown. Note that these control results are control results obtained in a case where the total correction term is restricted by the final guard while elimination of the air-fuel ratio deviation through feedback control is underway.

In the control result (A-3), the I term continues to increase even after the total correction term is restricted by the final guard. The reason for this is that the air-fuel ratio deviation remains, and therefore the update amount calculated from the air-fuel ratio deviation is continuously integrated into the I term. As a result, the I term continues to diverge until it impinges on the I term guard, which is set at a larger value than the final guard.

In the control result (B-3), on the other hand, the I term decreases without diverging after the total correction term is restricted by the final guard. The reason for this is that during updating, both the part of the post-guard I term that is cut by the PI term guard and the part of the total correction term that is cut by the final guard are subtracted from the I term. The part of the total correction term that is cut by the final guard corresponds to growth of the map term, and therefore, as the map term grows through learning, the amount subtracted from the I term increases such that the I term converges toward zero. At a point where shifting of the steady state error component from the I term to the map term is completed, the value of the I term is fixed at zero. Hence, according to this feedback control system, an operation for shifting the steady state error component included in the I term to the map term, or in other words a normal learning operation, can be realized even in a condition where the total correction term is restricted by the final guard.

OTHER EMBODIMENTS

The invention is not limited to the embodiments described above, and may be implemented after applying various amendments within a scope that does not depart from the spirit of the invention. For example, in the first embodiment, a control logic not including the I term guard may be employed. Further, in the second embodiment, a control logic not including the I term guard or a control logic not including the map guard may be employed. Furthermore, in the second embodiment, a control logic in which the corrected previous value is not switched to zero by a switch may be employed.

The feedback control system according to the invention may be applied to control other than control of an air-fuel ratio of a diesel engine. For example, the invention may be applied to boost pressure control or EGR control. Moreover, the invention is not limited to control of an internal combustion engine for an automobile, and may be applied widely to other examples of feedback control.

The invention claimed is:

1. A feedback control system that calculates a P term and an I term on the basis of a deviation between a target value and a measured value of an air-fuel ratio, and calculates a correction amount to be applied to at least one of fuel injection amount and an air amount of an internal combustion engine on the basis of a PI term, which is a sum of the P term and the I term, wherein the feedback control system comprises a controller programmed to:
   restrict a magnitude of the PI term using a first guard;
   calculate, as a corrected previous value of the I term, a value obtained by subtracting a difference between a value of the PI term prior to restriction by the first guard and a value of the PI term following restriction by the first guard, from a value of the I term;
   update the value of the I term by adding an update amount calculated from the deviation to the corrected previous value;
   store a learned term;
   calculate a sum of the PI term following restriction by the first guard and the learned term, as a total correction term used to calculate the correction amount;
   update a value of the learned term on the basis of the value of the PI term following restriction by the first guard;
   restrict a magnitude of the total correction term using a second guard; and
   correct the corrected previous value of the I term by subtracting a difference between a value of the total correction term prior to restriction by the second guard and a value of the total correction term following restriction by the second guard, wherein
   the controller controls one of a fuel injector and an air flow regulator in accordance with the correction amount.

2. The feedback control system according to claim 1, wherein the controller is further programmed to, when the value of the total correction term exceeds a value of the second guard and a value of a sum of the P term and the learned term exceeds the value of the second guard, fix the corrected previous value of the I term at zero.

3. The feedback control system according to claim 1, wherein the controller is further programmed to set a value of the second guard at a smaller value than a value of the first guard.

4. A feedback control system that calculates a P term and an I term on the basis of a deviation between a target value and a measured value of an air-fuel ratio, and calculates a correction amount to be applied to at least one of fuel injection amount and an air amount of an internal combustion engine on the basis of a PI term, which is a sum of the P term and the I term, wherein the feedback control system comprises a controller programmed to:
   restrict a magnitude of the PI term using a first guard;
   calculate, as a corrected previous value of the I term, a value obtained by subtracting a difference between a value of the PI term prior to restriction by the first guard and a value of the PI term following restriction by the first guard, from a value of the I term;
   update the value of the I term by adding an update amount calculated from the deviation to the corrected previous value; and
   restrict a magnitude of the P term using a third guard, wherein
   a value of the third guard is set at a value that is identical to or smaller than a value of the first guard, and
   the controller controls one of a fuel injector and an air flow regulator in accordance with the correction amount.

5. A feedback control system that calculates a P term and an I term on the basis of a deviation between a target value and a measured value of an air-fuel ratio, and calculates a correction amount to be applied to at least one of fuel injection amount and an air amount of an internal combustion engine on the basis of a PI term, which is a sum of the P term and the I term, wherein the feedback control system comprises a controller programmed to:
- restrict a magnitude of the PI term using a first guard;
- calculate, as a corrected previous value of the I term, a value obtained by subtracting a difference between a value of the PI term prior to restriction by the first guard and a value of the PI term following restriction by the first guard, from a value of the I term;
- update the value of the I term by adding an update amount calculated from the deviation to the corrected previous value; and
- restrict a magnitude of the I term using a fourth guard, wherein
  - a value of the fourth guard is set at a larger value than a value of the first guard, and
  - the controller controls one of a fuel injector and an air flow regulator in accordance with the correction amount.

6. The feedback control system according to claim 1, wherein the controller is further programmed to:
- restrict a magnitude of the I term using a fourth guard; and
- set a value of the fourth guard at a smaller value than a value of the first guard and a larger value than a value of the second guard.

7. The feedback control system according to claim 1, wherein the controller is further programmed to modify a value of the first guard in accordance with an operating condition of the internal combustion engine.

8. The feedback control system according to claim 4, wherein the controller is further programmed to modify a value of the first guard in accordance with an operating condition of the internal combustion engine.

9. The feedback control system according to claim 5, wherein the controller is further programmed to modify a value of the first guard in accordance with an operating condition of the internal combustion engine.

* * * * *